United States Patent

[11] 3,631,564

| [72] | Inventor | Antonio Mezzaqui |
| | | via Saliceton 49/3,, Bologna, Italy |
| [21] | Appl. No. | 819,136 |
| [22] | Filed | Apr. 25, 1969 |
| [45] | Patented | Jan. 4, 1972 |
| [32] | Priority | Apr. 27, 1968 |
| [33] | | Italy |
| [31] | | 1610 A/68 |

[54] MACHINE FOR AUTOMATICALLY PREPARING HAMBURGER-TYPE STEAKS
7 Claims, 6 Drawing Figs.

| [52] | U.S. Cl. | 17/32 |
| [51] | Int. Cl. | A22c 7/00 |
| [50] | Field of Search | 17/32 |

[56] References Cited
UNITED STATES PATENTS

| 2,817,200 | 12/1957 | Garfunkel | 17/32 X |
| 2,475,463 | 7/1949 | Santo | 17/32 |
| 2,651,430 | 9/1953 | Garfunkel | 17/32 |
| 2,799,044 | 9/1957 | Mahan | 17/32 |
| 3,060,493 | 10/1962 | Weien | 17/32 |
| 3,354,846 | 11/1967 | Ferrary et al. | 17/32 X |

*Primary Examiner*—Lucie H. Laudenslager
*Attorneys*—Robert E. Burns and Emmanuel J. Lobato

ABSTRACT: The disclosure concerns a machine for automatically preparing hamburger-type steaks wherein minced meat in a container is pressed into a cavity by rotating blades. Means are provided for supplying protective sheets to steaks, compressing the steaks, and removing them to a conveyor.

INVENTOR:
ANTONIO MEZZAQUI

By Robert E. Burns
Attorney

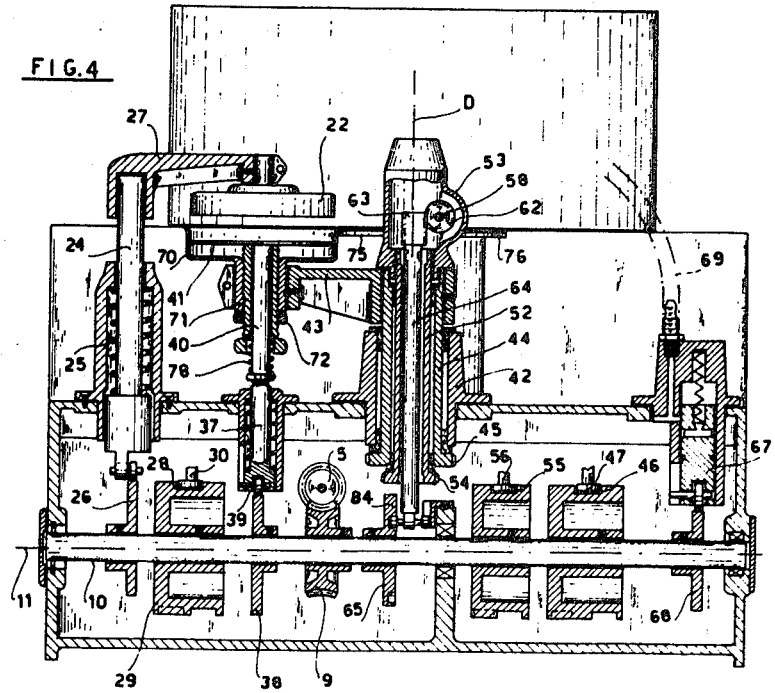
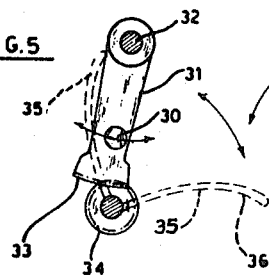
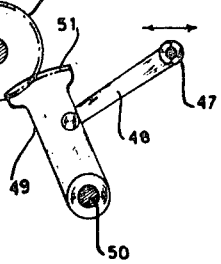

MACHINE FOR AUTOMATICALLY PREPARING HAMBURGER-TYPE STEAKS

The present invention relates to a machine particularly suitable for preparing "hamburger" or minced meat steaks which are provided with a dual sheet of paper or synthetic resin aiding in handling thereof in conformity with sanitary regulations.

Hamburger steaks, which comprise minced meat in the shape of a beefsteak, are already widely known and are prepared either manually or by small manually operated machines, or by continuous cycle machines.

Nowadays, manual preparation is solely a homely peculiarity, particularly because of the sanitary regulations, whereby even in various butchers' shops the above-indicated second type of small machines are used, whereas machines of the third type are employed by big industries, such machines being complicated and expensive and also requiring, interalia, a continuous production and therefore a storing for the product which is undesirable to many consumers.

The object of the present invention is to provide a machine for preparing hamburger-type steaks or patties which, while being quite inexpensive as compared with the above-mentioned third type of machines, can operate either as a continuous cycle machine, or can also be effectively used for readily preparing even one steak at a time, still in due conformity with sanitary regulations.

A feature of this invention is in that the machine comprises a magazine for the previously minced meat, the meat emerging therefrom automatically as metered and pressed.

A further feature of this invention is in that the minced meat pressing is accomplished by a rotating blade further inclining at due time to press the meat being drawn thereby.

Further features of the invention will be apparent from the following description and the accompanying drawings which diagrammatically show by way of example the essential elements for a practical embodiment of the invention.

FIG. 4 is an elevational sectional view of the machine taken along line IV—IV of FIG. 1.

FIGS. 5 and 6 show some of the particular movements for some essential members of said machine.

Figure 1:
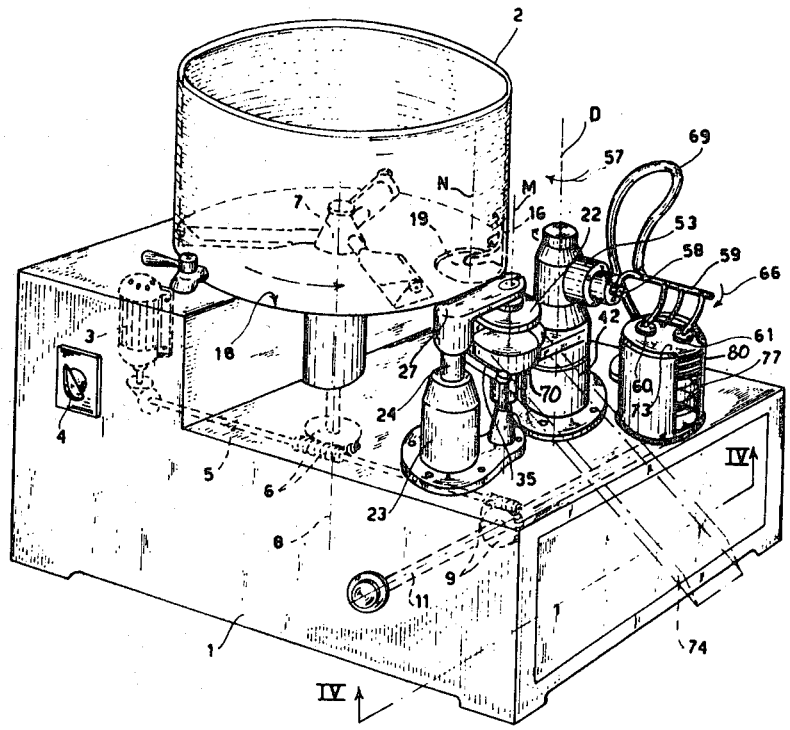
FIG. 1 is a perspective overall view showing a machine according to the invention.
Figure 2:
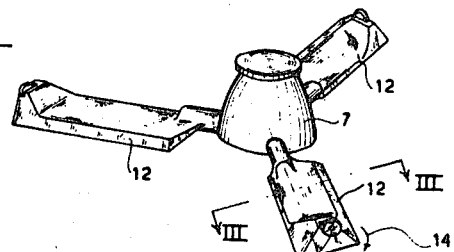
FIG. 2 is a perspective view of a three-arm blade for meat pressing.

Substantially, the machine comprises a casing 1, a cylinder 2 to which the previously minced meat is fed, and a set of moving members operating both internally and externally of said casing.

An electric motor 3, which can be started by a switch 4, drives a shaft 5 driving in turn by gearing 6 to the blade hub 7 rotating about axis 8 and driving by gearing 9 a shaft 10 rotating about axis 11.

The blade hub is provided with three or more arms 12 pivotally connected to the hub 7 for pivotal movement on axis 13 which extends radially from the hub 7, whereby, against the urging of an inner spring (not shown but which bias the arms into contact with the bottom of the cylinder 2) said arms can rotate about the axis 8 as well as pivot about the axis 13 in the direction shown by arrow 14.

A small roller 15 is pivoted at the outer extremity of each arm, the axis of said small roller 15 being offset to said axis 13 so as to provide a lever arm allowing arm 12 to rotate in the direction of arrow 14 when said small roller 15 is intercepted. A suitable shaped cam member 16 provides for intercepting the small roller 15 of each arm 12, said cam member 16 being arcuately arranged within cylinder 2 which provides for moving each arm 12 through the shaped lower surface 17 of cam 16.

Figure 3:
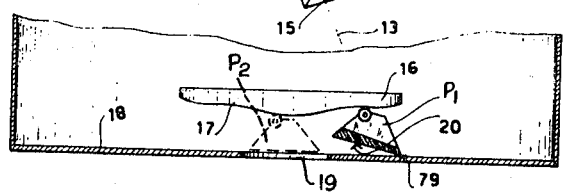
FIG. 3 is a sectional view of the blade taken along line III—III of FIG. 2 and its coaction with a camming means.

For all of the circumferential arc where arms 12 are not actuated by cam surface 17, said arms will assume a position $P_1$ and bear on plane 18 of cylinder 2 by apex 79 as shown in FIG. 3 whereupon, when intercepting said cam, they will pivot about the axis 13 to the position $P_2$ shown in dotted lines. When an arm is at position $P_2$ said arm will simultaneously be located over a circular hole 19 in plane 18 of cylinder 2, whereupon the space existing between the lower face 20 of an arm and plane 18 is filled with minced meat.

Rotation of shaft 10 actuates a set of actuating members in timed relationship therewith, the first member being a pressing disc 22 (see FIGS. 1 or 4), carried by a turret 23, within which a pin 24 can vertically slide against the action of a spring 25.

The base of pin 24 is in contact with a cam disc 26 through a roller (not numbered), so that upon rotation of shaft 10, pin 24, and hence the pressing disc 22 connected thereto by an arm 27, will be correspondingly reciprocated in a vertical direction.

The second member in the set is a cam 28 which is located on a drum 29, in which a pin 30 operates and is fast with an arm 31 pivoted at 32, having at the end thereof a toothed gear sector 33 meshing with a toothed pinion 34. A lever arm 35 is connected to rotate with the pinion 34 and at its end is provided with an ejector vane 36 which is accordingly pivoted back and forth between the two dashed positions shown in FIG. 5 in timed relationship with the other movements to intercept the prepared beefsteak and, acting as an ejector, urge or push it off of a support disc 41 into a chute 74.

The third member in the above-mentioned set is an element accomplishing the function of carrying the beefsteak on disc 41 to the ejection level and has a vertically moving pin 37 against a spring, the vertical reciprocating movement of said pin being allotted to the cam 38 against small roller 39 keyed on pin 37.

Said pin 37 can actuate the vertical bar 40, to the upper end of which the meat-holder disc 41 is applied when this is positioned as shown in FIG. 4.

The fourth member in the actuating set is a turret 42, wherein the members for moving the disc 41 carrying arm 43 are located. Arm 43 is fast with sleeve 44 which, through a crown gear 45, can rotate through a certain arc to effect movement of the disc and the disc container 70 from the position of the vertical axis M (FIG. 1) to the position of the vertical axis N corresponding to the center line of hole 19.

This movement, for example, is obtained by means of a grooved cam 46 as shown in FIG. 4, within the groove of which a pin 47 slides and is connected to lever 48 (FIG. 6) which is pivoted on a gear sector 49. The gear sector 49 is mounted for rotation about pivot 50 and in in response to rotational movement thereof rotatably drives a gear 45 and hence arm 43 through toothing 51. A lever arm 75 is connected to the container 70 and terminates by a plane sector 76 which, when the container is at the position as shown in FIG. 1, that is under the upper pressing disc 22, underlies the hole 19 thus preventing the meat in cylinder 2 from falling downward and exiting from the cylinder 2.

A further sleeve 52 is located within the turret 42, the turret head 53 and the crown gear 54 being fast therewith at the top and bottom, respectively, said crown gear 54 being capable of alternatively rotating in the direction of arrow 57 (FIG. 1), through cam 55 and pin 56 by means of a set of members similar to those indicated by FIG. 6. Through a rotatably mounted cross pin 58, a hollow bracket 59 is fast with the head 53, two suction valves or feeding suckers 60 and 61 being connected by hollow arms to to said bracket 59.

Gear 62 is fast with the pin 58 and meshes with a toothed rack 63 having a circular cross section and which is fast with a vertical shaft 64 sliding within said sleeve 52 and terminating at the bottom by connection to a transverse roller 84. The roller is mounted for sliding movement within a camming groove in a flange 65 which is connected for rotation with the shaft 10.

Therefore, the vertical reciprocating motion of shaft 64 is converted into a reciprocating rotary motion of valve-carrying-bracket 59 according to the direction of arrow 66 (FIG. 1).

The last member in the above mentioned actuating set is a pneumatic distributing valve 67 reciprocatingly driven by the rotary movement of the shaft 10 by cam 68 for transmitting from a vacuum or suction source (not shown), a vacuum condition to the suction valves or feeding suckers through the flexible tube 69 communicating with the interior of the hollow bracket 59 and valve arms.

In order to vary the beefsteak thickness as desired, the support disc 41 is adjustable in height relatively to the upper edge of container 70 through displacement of sleeve 71 by screwing the sleeve into or out of a threaded support; said sleeve 71 being then lockable in position by a locknut 72. The feeding suckers dip into the top of a container 80 wherein a set of cellophane wrappers or discs 73 are stacked and maintained at the same level by a biasing spring 77, so that the said suction valves may withdraw said discs one by one and carry them into a position overlying the disc 41 wither prior to or following meat arrival.

The movement for the various members will be more apparent upon examining the operation of the machine through a full operating cycle.

Starting from the position wherein the actuating members are as shown in FIG. 1 and assuming that some amount of minced meat is in container 2, upon starting said electric motor 3, the suction valves will first withdraw a cellophane wrapper sheet from container 80 and carry it onto the support disc 41 and then return again to their original position. At the same time, the blades 12 rotate and fill the cavity 21 with meat, said cavity 21 being closed at the bottom by said flat sector or disc 76. The container 70 and disc 41 will move and reach the position under cavity 19, so that the next adjacent blade places the meat in said cavity within the container 70 on disc 41, as a result of rotation thereof by cam 17 and roller 15.

The container 70 will now return to its original position and the meat on the support disc 41 receives a second cellophane sheet by another cycle of movement of said suction valves which is accomplished in the same manner used to transport the first cellophane sheet.

The upper pressing disc 22 is then lowered and penetrates into said container 70 to press the meat and form the beefsteak, which is thus pressed and reduced to a constant thickness and perfectly shaped by the coaction between the container 70, the support disc 41 and the pressing disc 22.

Cam 38 is then rotated into position whereupon the disc 41 is raised, moving the beefsteak thus formed to the level of the upper edge of the container 70, so that the ejector vane 36 will then eject the beefsteak causing it to reach the inclined chute 74.

A second and subsequent operating cycles then automatically follow in response to rotation of the shaft 10.

Obviously, the forms and structural details of the invention, also for providing differently shaped beefsteaks, can be carried out in a manner appropriate to the various technical requirements, provided that the functional technical concept be unaltered without departing from the scope of the present invention as defined in the following claims.

What is claimed is:

1. A machine for preparing meat patties comprising: a container receptive during use of the machine of minced meat to be formed into meat patties and having means in the base thereof defining an opening; a hub rotatably mounted on said base within said container; a plurality of blades connected to said hub extending radially outwardly therefrom cooperative together in response to rotational movement of said hub to force the minced meat into said opening; means mounting said blades for pivotal movement about their radially extending axis; cam means positioned within said container for camming each blade into pivotal movement about its radially extending axis when said blade is rotated into the vicinity of said opening to render said blade more effective to force the minced meat into said opening; meat patty forming means including receiving means alternately movable into and out of alignment beneath said opening to receive therein the minced meat for forming same into a meat patty; drive means for effecting both rotational movement of said hub and alternate movement of said receiving means into and out of alignment beneath said opening; wrapper applying means operable in timed relationship with said drive means for automatically applying a wrapper to the formed meat patty while same is in said meat patty forming means; and ejecting means operable in timed relationship with said drive means for ejecting the wrapped meat patty from said meat patty forming means.

2. A machine according to claim 1; wherein said meat patty forming means includes pressing means coacting with said receiving means after same has received minced meat therein and has moved out of alignment with said opening for pressing the minced meat into a meat patty.

3. A machine according to claim 1; including a planar projection movable beneath said opening to prevent minced meat from falling therethrough, and means for alternately moving said planar projection out of and into alignment beneath said opening whenever said receiving means is correspondingly moved into and out of alignment beneath said opening.

4. A machine according to claim 1; wherein said meat patty forming means includes means for selectively adjusting the thickness of the meat patties.

5. A machine according to claim 8; wherein said drive means includes a rotationally driven shaft, gear means driven by said shaft for effecting continuous rotational movement of said hub, and camming means cyclically driven by said shaft for alternately effecting movement of said receiving means into and out of alignment beneath said opening.

6. A machine according to claim 5; wherein said wrapper applying means includes another camming means cyclically driven by said shaft for controlling the operation of said wrapper applying means; and wherein said ejecting means includes additional camming means cyclically driven by said shaft for controlling the operation of said ejecting means.

7. A machine according to claim 1; wherein said wrapper applying means comprises a source of wrappers, suction means for individually withdrawing wrappers from said source by suction and transporting same to said meat patty forming means, and valve means for controlling the suction of said suction means in timed relationship with said drive means.

* * * * *